Feb. 1, 1966

KIYOSHI KITAI 3,232,199

LENS SHUTTER OPERATING SYSTEM

Filed Nov. 14, 1962

United States Patent Office 3,232,199
Patented Feb. 1, 1966

3,232,199
LENS SHUTTER OPERATING SYSTEM
Kiyoshi Kitai, Shinjuku-ku, Tokyo-to, Japan, assignor to Kabushiki Kaisha Hattori Tokeiten, Ginza, Chou-ku, Tokyo-to, Japan, a joint-stock company of Japan
Filed Nov. 14, 1962, Ser. No. 237,695
Claims priority, application Japan, Nov. 17, 1961, 36/41,245
1 Claim. (Cl. 95—63)

This invention relates to lens shutters for photographic cameras, and more particularly it relates to a new shutter blade operating system for lens shutters.

Heretofore, camera shutters having lens shutter operating systems in which the area of the shutter blade aperture is adjustably varied in accordance with the desired exposure time have been of the following two types. In one type, the opening positions of the shutter blades are varied by moving the pivotal points of the shutter blades. In the other type, an elastic member is interposed between the main driving device and the blade operating ring, and, by varying the configuration of the elastic member as necessary so as to vary the operating angle of the shutter blade ring, the opening positions of the shutter blades are varied.

In the former of these types, since the pivotal points of the blades are moved, the method of stably supporting the blades which rotate at high speed presents a difficult problem. The latter type has the disadvantage of difficulty in selecting a suitable material for the elastic member, and, in addition, the disadvantage of increased instability of the shutter speed due to the imposition of the elastic resistive force as a direct resistance on the main driving device.

It is an object of the present invention to provide a lens shutter operating system in which the shutter blade opening is made to be varied with such object as that a higher shutter speed than that of the conventional shutter can be obtained by use of a small shutter opening aperture and shutter opening is made to be varied by making the shutter correlate to the diaphragm in the case of program shutter, thus enabling obtaining of a program shutter having a high precision and a wide adjusting-range.

It is another object to provide a lens shutter operating system as stated above wherein the main driving device is not subjected to a large resistance due to elastic resistive force, and both adjustment and operation can be accomplished smoothly.

The details of the invention will now be described with respect to an illustrative embodiment thereof in conjunction with the accompanying illustrations in which like parts are designated by like reference numerals, and in which.

Figure 1:
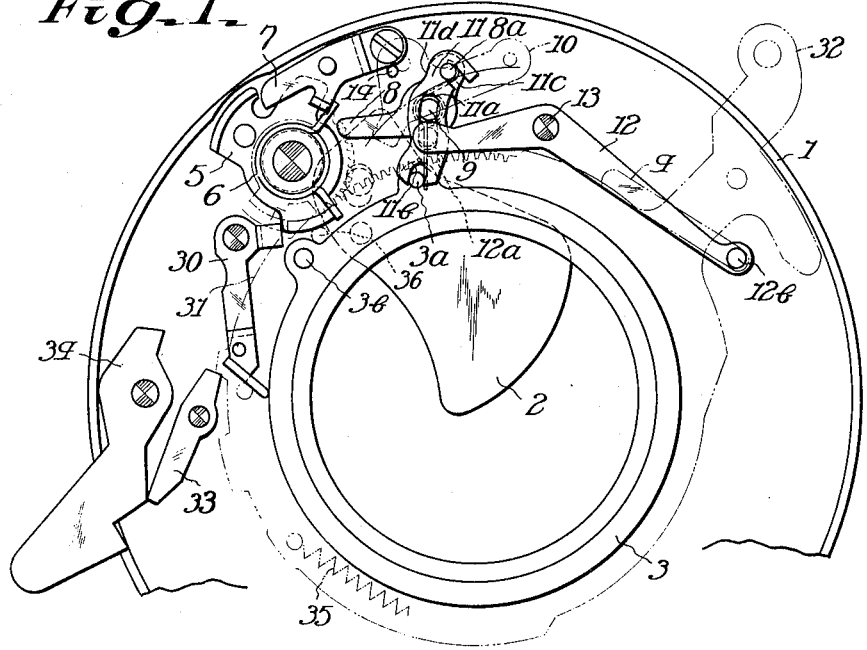
FIG. 1 is a front elevational view showing the essential parts of the embodiment in the condition wherein the shutter is charged or cocked.

Referring to the drawings, the essential parts of the embodiment are enclosed within a shutter case 1 which is disposed substantially concentrically about a shutter blade ring 3, which actuates shutter blades 2 (only one being shown). Reference numeral 4 designates a slot cam formed in a speed control member (speed adjusting cam) of known type. This slot cam 4 may be straight or curved depending on the design. Operating power is derived from a main operating member 5 which is driven by a main driving spring 6 and arrested by a main operating member stop plate 7. A main operating lever 8 is provided to pivot about a shaft 9. Reference numeral 10 designates a speed-control governor coupling lever. The shutter blade ring 3 has a pin 3a fixed thereto which is engaged with a forked end 11b of an intermediate lever 11, which further has a slot 11a at its middle part and an open guide slot 11c at its other end engaged with a pin 8a fixed to one end of the aforesaid main operating lever 8. A pivotal point adjusting lever 12 is pivoted about a shaft 13 and has a pin at each of its ends. One of these pins, 12a, is engaged with the afore-mentioned slot 11a of the intermediate lever 11, and the other, 12b, is engaged with the afore-mentioned slot cam 4.

The shutter of this invention is charged and placed in the state indicated in FIG. 1 by manually rotating a set lever 32 in the clockwise direction. This manipulation causes a set gear 31 to rotate clockwise, rotating the main operating member 5 together therewith, and to engage with a pawl 30 for arresting the main operating member, whereupon the charging operation is completed.

To release the shutter, release lever 34 is pressed in the counter-clockwise direction. This manipulation causes a pawl 33 for arresting the set lever to rotate also counter-clockwise and release the set lever 32. Consequently, the set lever 32 is caused by a spring 35 to rotate counter-clockwise, and during this return motion of the set lever 32, pin 36 fixed on the set lever 32 pushes up the pawl 30, for arresting the main operating member 5, in the clockwise direction, thereby causing this pawl 30 to disengage from the main operating member 5. Accordingly, the main operating member 5 is caused by the force of the main driving spring 6 to begin a high-speed, clockwise rotation, at which instant the shutter mechanism is in the state indicated in FIG. 2.

Figure 2:
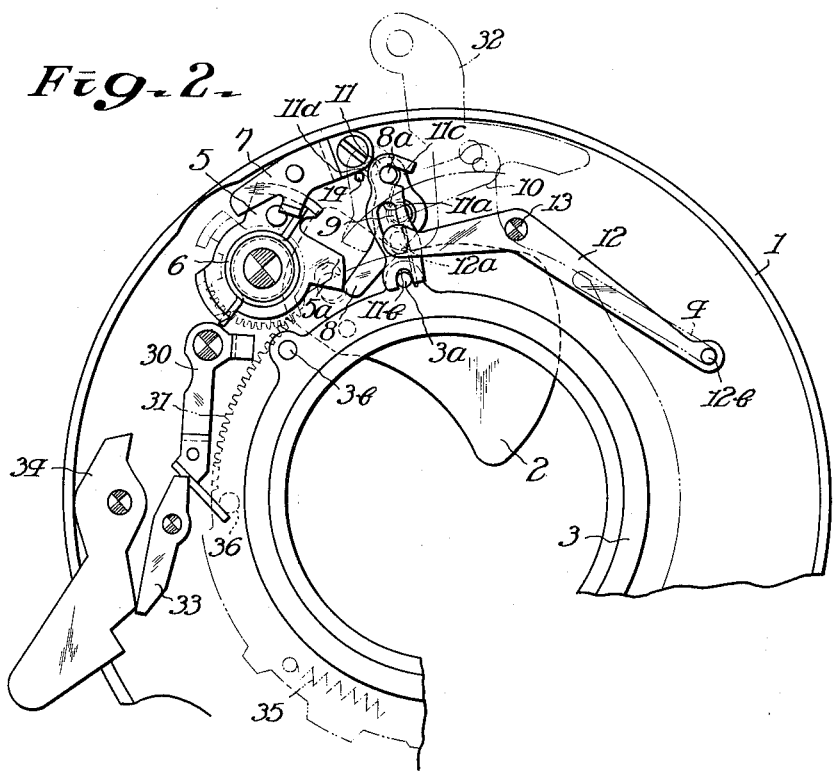
FIG. 2 is a similar view showing the essential parts in the condition wherein the main driving device has rotated, and the shutter blades (only one shown) are in an opened state.

As shown in FIG. 2, the main operating member 5 starts to rotate, and its lug 5a pushes against one end of the main operating lever 8, turning this lever in the counter-clockwise direction about the shaft 9 as its pivot. Since the pin 8a of the main operating lever 8 is engaged with the intermediate lever 11, as described hereinbefore, a counter-clockwise rotation of the main operating lever 8 causes this intermediate lever to rotate together therewith also in the counter-clockwise direction. The pivot of the intermediate lever 11 is the pin 12a, which is fixed to the pivotal point adjusting member 12, and this member 12 is suitably adjusted according to necessity. Variation of the position of the pivot 12a of the intermediate lever 11 causes a variation in the rotational angle of this lever 11. Accordingly, it is possible to vary, according to necessity, the operating stroke of the pin 3a which transmits the movement of the forked end 11b of the intermediate lever 11 to the shutter blade ring 3. FIG. 2 illustrates the case wherein the operating stroke of the intermediate lever 11 is adjusted to be small, whereby the rotational angle of the shutter blade ring 3 also becomes small, and the shutter blades (only one being shown) are placed in a half-open state.

Figure 3:
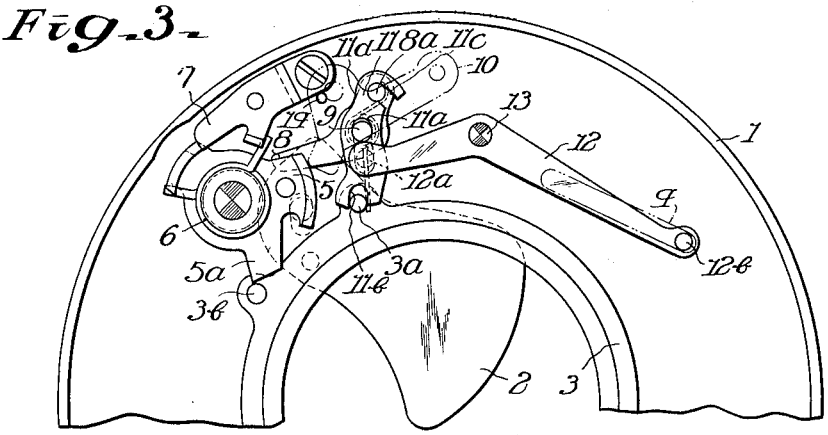
FIG. 3 is a similar view showing the essential parts in the condition wherein the main driving device has rotated further to close the shutter blades.

The main operating member 5 continues to rotate further in a clockwise direction from its state shown in FIG. 2, and its lug 5a, disengaging from the tip of the main operating lever 8, pushes against a pin 3b fixed to the shutter blade ring 3, thereby rotating the ring 3, this time, in the counter-clockwise direction as indicated in FIG. 3. When the ring 3 is rotated by the main operating member 5 to the position of the ring 3 shown in FIG. 1, the shutter blades 2 are closed.

The exposure operation of the shutter according to this invention is repeated in the sequence indicated by:

FIG. 1→FIG. 2→FIG. 3→FIG. 1

Figure 4:
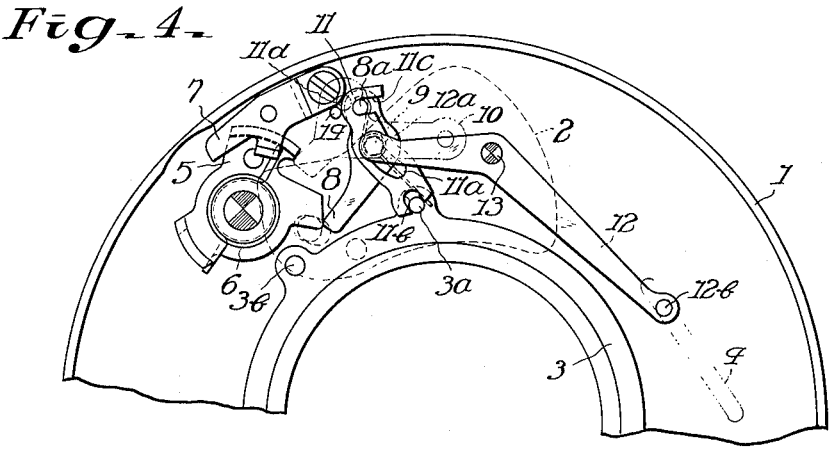
FIG. 4 is a similar view showing the opened condition of the blades in the case wherein the aperture area of the blades has been changed by a shutter speed control member (not shown)

FIG. 4 shows the shutter mechanism in the state wherein the opening limit of the shutter blades 2 has been adjusted to full-opening, and the shutter blades are in the fully open state. This state may be best compared with that shown in FIG. 2.

In the state shown in FIG. 4, the pivotal point adjusting lever 12 has been adjustably varied so as to raise the position of the pin 12a to a point nearer to the pin 8a. When the main operating member lug 5a rotates the main operating lever counter-clockwise, the pin 8a rotates the intermediate lever 11 also in the counter-clockwise direction. However, since the pin 12a is positioned nearer to the pin 8a than in the case shown in FIG. 2, the rotational angle of the intermediate lever 11 becomes extremely large. Consequently, the intermediate lever 11 rotates the pin 3a of the shutter blade ring 3 through a large angle of rotation, thereby causing the shutter blades to open to the full-open position.

That is, the present invention provides a lens shutter operating system wherein there is provided an intermediate member 11, which is capable of variably adjusting pivotal points, between the main driving device and a shutter blade ring 3 and a pivotal point adjusting member 12 between this intermediate member 11 and a speed-control member or a member functionally equivalent thereto, and by adjusting this speed-control member, or the functionally equivalent member, according to necessity, the pivotal point of the intermediate member 11 is changed, and, consequently, the rotational operation angle of the intermediate member 11 is changed, whereby the operating angle of the shutter blade ring 3 is changed, and the opened position of the shutter blades 2 is thereby variably adjusted.

By the above-described mechanical arrangement according to this invention, the pivotal points of the shutter blades are fixed points. Therefore, the operation of the shutter blades is stable, and, moreover, since the variation of the rotational angle of the shutter blade ring is merely a change of the position of the rotational pivot of the intermediate member, the main driving device is not subjected to the resistance of a high elastic resistive force, and both adjustment and operation can be accomplished in a smooth manner.

Figure 5:
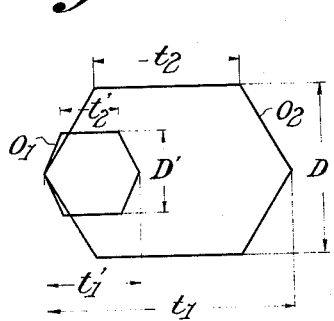
FIG. 5 shows relation between the exposure time and shutter blade opening aperture in the case of the present invention.
Figure 6:
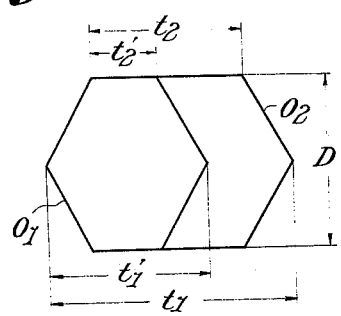
FIG. 6 shows the same relation as that of FIG. 5 in the case of the conventional shutter system.

In FIG. 5 is shown variation of the exposure time in the case in which the shutter blade opening is varied by the mechanism of this invention. FIG. 6 corresponds to FIG. 5 in the case of conventional shutter. In FIGS. 5 and 6, shutter blade opening aperture and exposure time are represented, respectively, in the vertical axis and abscissa. In the cases of FIG. 5 and FIG. 6, when the shutter blade opening aperture is D and the exposure time is longest, times $t_1$ and $t_2$ in FIG. 5 are equal to the time $t_1$ and $t_2$ in FIG. 6. However, when the shutter speed is increased, the shutter blade opening aperture is varied from D to D' in the case of FIG. 5 and the aperture D is constant in the case of FIG. 6. Consequently, the time $t_1'$ corresponding to the case in which the shutter blade opening aperture is varied (the case of FIG. 5) becomes remarkably shorter than that of the case of FIG. 6. Furthermore, the operating range of the shutter blade ring becomes smaller in the case of variation of the shutter blade opening aperture than the conventional case corresponding to the case of FIG. 6, whereby inertia is made small and the time $t_2'$ also becomes short. Accordingly, according to this invention, a shutter speed higher than that of the conventional case can be obtained by varying the shutter blade opening aperture.

Although this invention has been described with respect to a particular embodiment thereof, it is not to be so limited as changes and modifications may be made therein which are within the full intended scope of the invention, as defined by the appended claim.

What is claimed is:

In a lens shutter capable of adjusting the degree of opening of shutter blades in response to shutter speed, a lens shutter operating means including a rotatable main driving device, a shutter blade actuating member, a shutter speed control member, a pivotally mounted operating lever adapted to be moved by rotation of the main driving device, an intermediate lever, means operably connecting one end of the intermediate lever to the operating lever, means operably coupling the other end of the intermediate lever to the shutter blade actuating member, said intermediate lever having a guide slot, a pivotally mounted adjusting lever, pin means at one end of the adjusting lever engageable with the guide slot for providing a pivot point for the intermediate lever, second pin means at the other end of the adjusting lever engageable with the shutter speed control member, and the pin means being displaceable in the guide slot in response to the shutter speed via the adjusting lever for displacing the pivot point of the intermediate lever for varying the operating angle of the intermediate lever and adjusting the opening degree of the shutter blades.

References Cited by the Examiner

UNITED STATES PATENTS

| 436,404 | 9/1890 | Dallmeyer | 95—63 |
| 761,756 | 6/1904 | Brueck | 95—63 |
| 3,093,049 | 6/1963 | Starp | 95—64 |
| 3,200,729 | 8/1965 | Stamp | 95—63 |

JOHN M. HORAN, *Primary Examiner.*

NORTON ANSHER, *Examiner.*